July 26, 1960
F. W. LINDBLOM
2,946,258
SPECTACLE FRAME
Filed Feb. 24, 1955
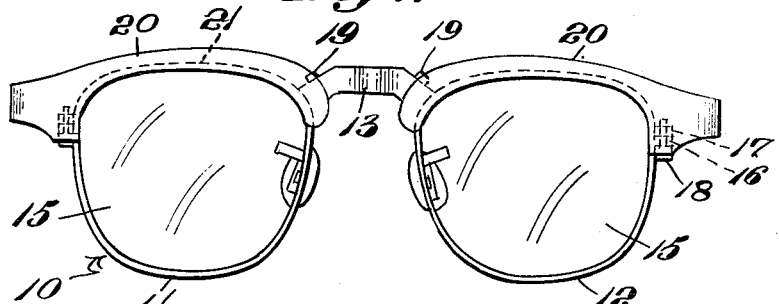
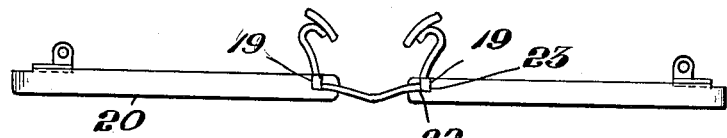
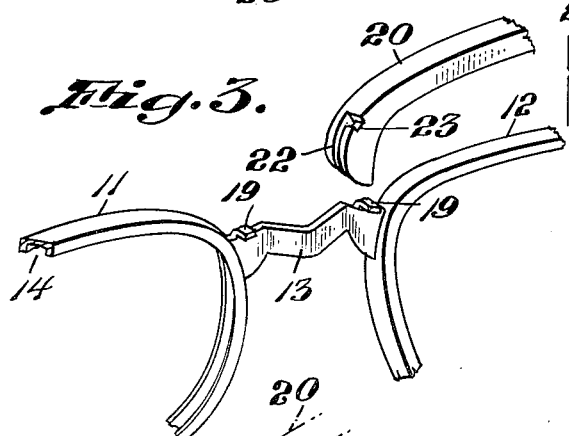
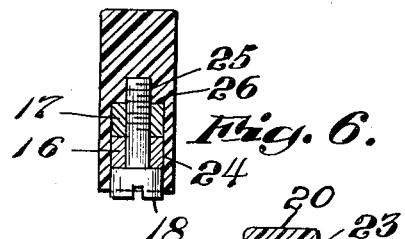
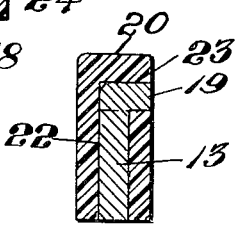
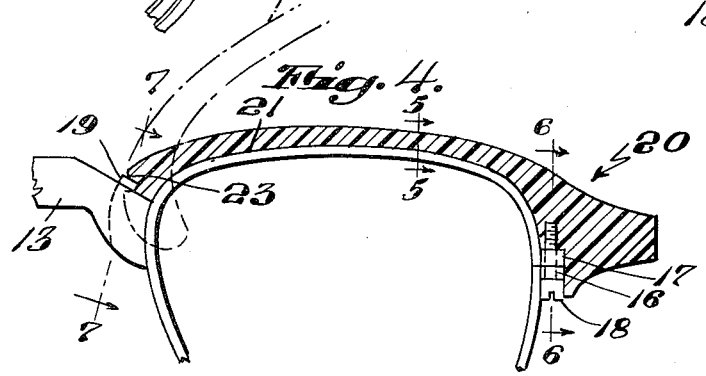
INVENTOR.
Frank W. Lindblom
BY
Barlow & Barlow
ATTORNEYS.

United States Patent Office 2,946,258
Patented July 26, 1960

2,946,258

SPECTACLE FRAME

Frank W. Lindblom, Warwick, R.I., assignor to Welsh Manufacturing Company, a corporation of Rhode Island Filed Feb. 24, 1955, Ser. No. 490,335

5 Claims. (Cl. 88—41)

This invention relates to a spectacle frame of the type having metallic lens rims, the upper edge of which are enclosed in non-metallic rim portions.

The upper non-metallic rim portions of a spectacle of the above type are in many instances secured in place by rivets. In other instances interlocking means are provided between the metallic and non-metallic portions of the spectacle which require some mechanical pressing action to interlock the parts. These have proven to be unsatisfactory in regard to the cost of manufacture, appearance, and for other reasons.

The object of the present invention is to provide a spectacle frame of the above type so constructed as to eliminate rivets and in which the lens rim and upper rim portion may be easily manually assembled without the use of mechanical means.

A more specific object of the invention is to provide a spectacle frame having a metallic bridge provided with an abutment to interlock with a complementary recess at a location on the non-metallic rim portion to be readily accessible for engagement with said abutment.

With these and other objects in view, the invention consists of certain novel features of construction as will be more fully described and particularly pointed out in the appended claims.

In the accompanying drawings:

Figure 1 is a front elevation of a spectacle frame embodying my invention;

Figure 2 is a top plan view of the same;

Figure 3 is a rear exploded view on a larger scale in perspective showing a fragmentary portion of the lens rim and upper non-metallic rim portion;

Figure 4 is an elevational view on an enlarged scale of a fragmental portion of the spectacle frame and showing the upper non-metallic rim portion in section;

Figures 5, 6 and 7 are sectional views taken substantially along lines 5—5, 6—6, and 7—7, respectively, of Figure 4.

The spectacle according to the invention comprises a metallic lens rim which is connected to a metallic bridge in the known manner. The upper part of the lens rims are each enclosed in a non-metallic rim part extending from the bridge to beyond the temporal side of the lens rim so as to provide attachment to the said lens rim and also provide a portion for attachment of the temple. The nasal end of the non-metallic rim part has an end groove which is adapted to receive an adjacent portion of the bridge and has formed therein a recess in which is received a lug and/or the like which extends at one side of the bridge, preferably the rear side thereof. The interlocking of the lug and walls of the recess is such as to require a pivotal action of the rim part about the said lug to seat the said rim part over the lens rim to be thereafter secured to the lens rim as by means of a fastening screw which extends through the lens rim connectors into screw threaded engagement with the said non-metallic rim part. There is thus provided a simple expedient for attaching a non-metallic rim part on to lens rims without the use of rivets or the like fastening or interlocking means which require mechanical action such as a pressing action to force the interlocking means into proper engagement with each other.

Referring to the drawing for a more detailed description of the invention, 10 designates generally a spectacle frame having metallic lens rims 11 and 12 which are connected in the known manner to a metallic bridge 13. Each lens rim is made of the usual eye wire material in which a lens groove 14 (see Figure 3) is formed to receive the lens 15. The lens rims are split at their temporal side and provided with connectors 16 and 17 which are short, hollow metal cylinders attached in position as by soldering. The connector 17 is internally screw threaded to receive the threaded shank of a fastening screw 18 by means of which the lenses 15 are detachably held in the lens groove 14.

The bridge 13 (see Figure 3) according to the invention is made of flat stock in keeping with the dictates of present day spectacle styling and has a lug or finger 19 formed at the upper edge thereof at a position near the nasal end of the bridge. This lug is bent toward the rear to extend beyond the rear side of the bridge and is raised slightly from the said upper edge of the bridge.

A non-metallic rim part designated 20 formed of a suitable non-metallic plastic material extends along the upper part of each lens rim from the bridge 13 to beyond the temporal side of the lens rims. Each rim part 20 is similar in structure and has a groove 21 (see Figure 5) within which the lens rim seats. There is formed at the nasal portion of the rim part 20 a slot 22 (see Figure 3) which extends inwardly from the upper edge of the rim part to intersect the groove 21 and is adapted to receive the adjacent portion of the bridge 13. A notch or recess 23 (see Figure 3) is formed in the upper side of the rim part 20 to extend inwardly from the rear side thereof to intersect with the slot 22 at the inner end thereof. The recess 23 is of a size to be complemental to the lug 19 and is adapted to receive the same therein and permit a pivotal movement of the part 20 about the lug 19 as will hereinafter appear. The temporal portion of the rim part 20 has a bore 24 (see Figure 6) which is reduced at its inner end as at 25 and forms a shoulder 26. The enlarged portion of bore 24 is adapted to receive the connectors 16, 17 to engage against shoulder 26. The bore 25 is threaded and the screw 18 is of a length to engage the threads in the smaller bore portion 25 so as to secure the lens rim to the rim part 20.

In assembling the rim part 20 to the lens rim, the rim part may first be inserted over the lens rim as shown in broken lines in Figure 4 with the sides of the slot 22 straddling the portion of the bridge between the lens rim and lug 19. The rim part may now be moved so that the recess 23 engages the lug 19 and swung about lug 19 as a fulcrum toward the temporal end of the lens rim so as to seat the lens rim in groove 21 and insert the connectors 16, 17 within the bore 24. It should be noted that the rim part 20 is sufficiently resilient to permit spreading of the walls of the slot to be passed over the lens rim and then recover, the slot being narrower than the width of the eye wire. The screw 18 may now be inserted through the connectors to secure the parts to each other as previously described. Referring to Figure 7, it will be apparent that the nasal end of part 20 engages beneath the tab 19 and cannot be lifted from the bridge or removed from position other than by a reversal of the assembly procedure above defined.

From the above description it will be apparent that the lug 19 may be made integral with the bridge and be part of the blank therefor. It will also be apparent that the lug 19 and recess 23 are located such as to be readily engaged one with the other without any excessive spreading of the walls of slot 22. Thus, the side of the slot 22 will readily recover from the slight spreading which may be required to insert the same over the lens rim at a position to engage the recess 23 with the lug 19.

I claim:

1. In a spectacle, a pair of metallic rims, each being split at the temporal side thereof with each rim having at its ends upper and lower connector lugs, a metal bridge connecting the nasal side of said rims and having at each end portion an integral finger bent from the upper edge thereof to extend at substantially right angles to generally the plane of the bridge, a non-metallic rim part extending along the upper portion of each rim and having top and side walls forming an internal groove within which the rims are seated, said rim part having a slot extending inwardly in said top wall at the nasal end thereof to receive the adjacent bridge portion, said side walls at the slotted end extending downwardly providing ears extending along either side of said bridge, one of said ears having a recess joining said slot for receiving said finger which may be positioned therein by upwardly inclining said rim portion, and means for securing the temporal end of said rim part in position.

2. In a spectacle, a pair of metallic rims, each being split at the temporal side thereof with each rim having at its ends upper and lower connector lugs, a metal bridge connecting the nasal side of said rims and having at each end portion an integral finger bent from the upper edge thereof to extend at substantially right angles to generally the plane of the bridge, a non-metallic rim part extending along the upper portion of each rim and having top and side walls forming an internal groove within which the rims are seated, said rim part having a slot extending inwardly in said top wall at the nasal end thereof to receive the adjacent bridge portion, said side walls at the slotted end extending downwardly providing ears extending along either side of said bridge, one of said ears having a recess joining said slot for receiving said finger which may be positioned therein by upwardly inclining said rim portion, the temporal end of said rim part having a recess within which said lugs are positioned, a screw to fasten the upper and lower connector lugs, said screw being of a sufficient length to threadingly engage the rim part adjacent the lugs and hold the lens rim through the connector lugs in abutting relationship with the rim part.

3. A spectacle frame according to claim 1 wherein said finger is formed of the same piece of material as the bridge.

4. A spectacle frame according to claim 1 wherein said finger is formed on the upper edge of the rim and bent to extend beyond the rear side of the bridge substantially at right angles thereto.

5. A spectacle frame according to claim 4 wherein said recess is at a position in the rear side wall of said slot and inwardly of the inner end of the slot.

References Cited in the file of this patent

UNITED STATES PATENTS

| 2,688,273 | Markell | Sept. 7, 1954 |
| 2,703,036 | Splaine | Mar. 1, 1955 |
| 2,749,800 | Gagnon | June 12, 1956 |
| 2,752,820 | Lindblom | July 3, 1956 |
| 2,777,361 | Stegeman | Jan. 15, 1957 |

FOREIGN PATENTS

| 704,696 | Great Britain | Feb. 24, 1954 |
| 1,071,455 | France | Mar. 3, 1954 |